United States Patent [19]
Pedronno et al.

[11] Patent Number: 6,000,759
[45] Date of Patent: Dec. 14, 1999

[54] HEADREST FOR AN AUTOMOBILE VEHICLE SEAT

[75] Inventors: Philippe Pedronno, Marcoussis; Laurent Sabourin, Etampes, both of France

[73] Assignee: Bertrand Faure Equipements S.A., Boulogne Cedex, France

[21] Appl. No.: 09/234,443

[22] Filed: Jan. 21, 1999

[30] Foreign Application Priority Data

Jan. 23, 1998 [FR] France .................................. 98 00882

[51] Int. Cl.⁶ ............................................ A47C 1/10
[52] U.S. Cl. .................................... 297/391; 297/410
[58] Field of Search ............................. 297/391, 410

[56] References Cited

U.S. PATENT DOCUMENTS

| | | | |
|---|---|---|---|
| 3,706,472 | 12/1972 | Mertens . | |
| 4,693,515 | 9/1987 | Russo et al. . | |
| 4,693,516 | 9/1987 | Knecht | 297/391 |
| 5,181,763 | 1/1993 | Dellanno et al. | 297/391 |
| 5,257,853 | 11/1993 | Elton et al. | 297/391 |
| 5,290,091 | 3/1994 | Dellanno et al. | 297/391 |
| 5,398,996 | 3/1995 | Sterner | 297/391 |
| 5,664,840 | 9/1997 | Stenzel . | |
| 5,816,657 | 10/1998 | Hecht et al. | 297/391 |
| 5,895,094 | 4/1999 | Mori et al. | 297/391 X |

FOREIGN PATENT DOCUMENTS

| | | |
|---|---|---|
| 2731960 | 9/1996 | France . |
| 3300506 | 7/1984 | Germany ............................... 297/410 |
| 42 21 610 | 1/1994 | Germany . |
| 197 47 283 | 11/1997 | Germany . |
| 9-215551 | 8/1987 | Japan . |
| 9-168451 | 6/1997 | Japan . |

*Primary Examiner*—Peter R. Brown
*Attorney, Agent, or Firm*—Pollock, Vande, Sande & Amernick

[57] ABSTRACT

A vehicle seat headrest includes a pad that has a generally horizontal main body portion that overlies the top of a backrest and a lip portion that overlies an upper forward portion of the backrest. The headrest includes a resilient curved frame plate that follows a confronting profile of the backrest and serves as a rear support for the main body portion and lip portion of the pad. The headrest further includes pins with upper ends secured within the plate and lower ends slidingly received within the backrest.

7 Claims, 2 Drawing Sheets

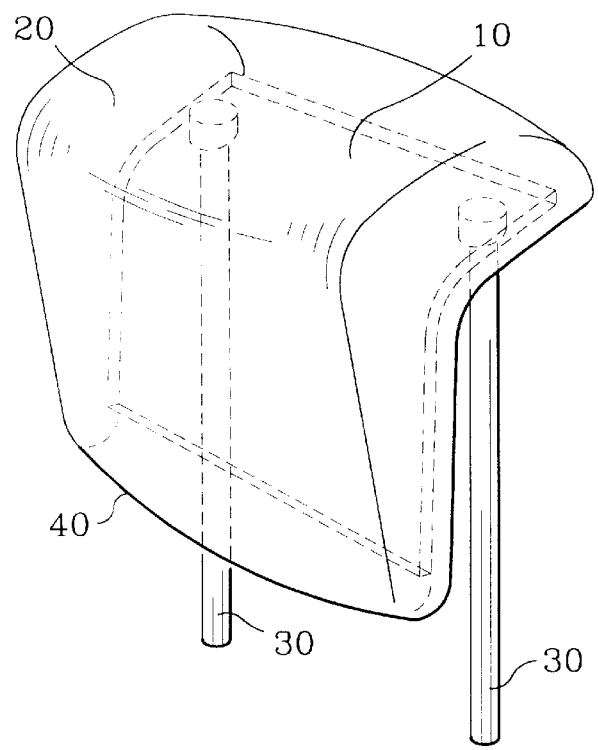
FIG. 3
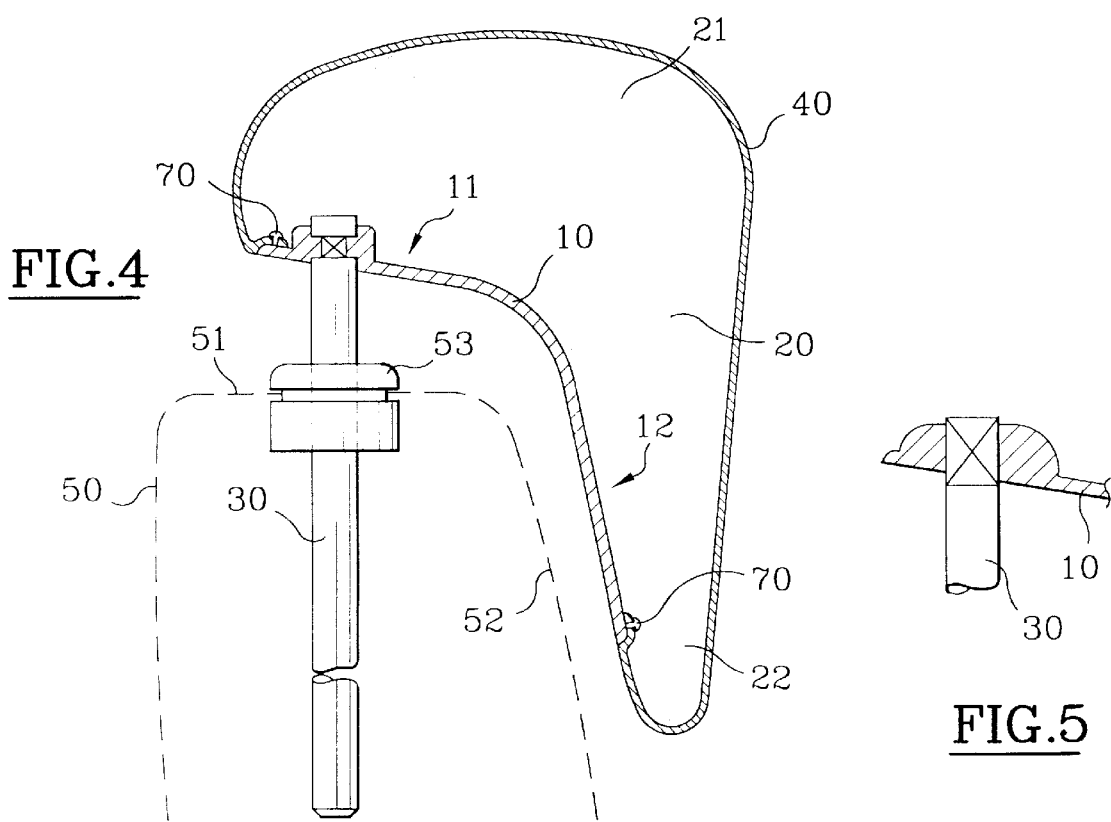
FIG. 4
FIG. 5

HEADREST FOR AN AUTOMOBILE VEHICLE SEAT

FIELD OF THE INVENTION

The invention concerns a headrest for an automobile vehicle seat and more especially relates to a headrest known as "comma headrest".

BACKGROUND OF THE INVENTION

Document JP-A-09168451 shows an example of a "comma headrest". The commonly used "comma" designation for a headrest is mainly due to its special profile allowing it, when the headrest is placed in low position, to cover the top of the seat backrest, that is the top of the backrest and also a part of the backrest bearing surface or, in another configuration, to fit into a cutout of corresponding shape made in the top of the backrest.

FIGS. 1 and 2 of the appended drawings show a "comma headrest" of known type including a tubular framework 1 acting as support for a foam padding 2, this being generally covered by a fabric 3, or any other covering, designated "cover".

As shown on FIG. 2, the tubular framework is generally U-shaped and the parallel arms of the U are bent to form two pins 5 enabling the height of the headrest to be adjusted. Moreover, the framework 1 is curved so as to follow the profile of the top of the backrest 4, as shown on FIG. 1, to cover the top of the backrest 40 and an upper portion 41 of the front bearing surface of the backrest when the headrest is placed in low position by the user.

The comma headrest is generally used for rear seats. Indeed, unlike a headrest of conventional design which, when placed in low position, protrudes well above the backrest, the comma headrest improves the drivers' rear view on account of its much lower overall dimensions. Also, for a rear seat with a folding backrest, it avoids the need to remove the headrest from the backrest to fold the backrest down onto the seat.

Generally, to assemble the comma headrest of FIG. 1, the cover 3 includes two openings to accommodate the framework and a hole to inject the foam forming the padding. The cover fitting operation requires many handling operations which increases the manufacturing costs of such a headrest. Also, due to the fact that the thickness of the padding is reduced between the framework and the cover in the lower portion of the headrest, the presence of the framework may be detrimental to the comfort of the headrest.

BRIEF DESCRIPTION OF THE INVENTION

The aim of the invention is to propose a new comma headrest using a framework which enables comfort to be improved and reduces the manufacturing costs by simplifying the installation.

With these targets in mind, the subject of the invention is a headrest for an automobile vehicle seat, the said headrest including a body and a lip attached to a framework acting as support for the padding, the body bearing against the top of the backrest and the lip covering a portion of the bearing surface of the backrest by extending towards the seat pan, the headrest also including pins which are fitted into sockets fixed onto the backrest framework. The headrest is characterized in that its framework consists of a thin plate, curved so that it follows the profile at the top of the backrest and onto which the pins are attached.

Thanks to the use of a thin plate, the overall size of the framework is significantly reduced and the comfort of the headrest improved especially in the lower portion of the headrest. Also, when a force is applied against the portion forming the lip of the headrest in a direction more or less perpendicular to the lip, for example the force exerted by the user's head during a shock, the lip of the framework is deformed by bending elastically towards the backrest of the seat on account of the overhang existing between the lip and the attachment of the headrest pins. The framework of the headrest therefore limits head injuries by deforming during a shock. Moreover, when the force is removed from the headrest, the headrest can return to its normal utilization position by the elastic recall effect.

According to a specific arrangement, a cover is placed over the padding and held onto the plate by attaching means such as studs, the padding being placed on the upper face of the plate. Preferably, the cover includes an opening the edge of which is fastened onto the periphery of the plate.

In this special arrangement, the use of the plate facilitates the assembly of the comma headrest. Indeed, the cover forms a sort of cap which is placed over the front face of the plate and, more precisely, the edge of the cover clips onto the studs placed around the periphery of the plate and located near to the edge of the plate. The cover is then filled with injected foam to form the padding. The bonding of the foam onto the front face of the plate, by the opening made in the cover, holds the cover onto the plate complementing the function ensured by the studs.

Preferably again, the plate is obtained by moulding and an end portion of the pins, forming inserts, is embedded into the plate.

This arrangement simplifies the attachment of the pins to the framework avoiding the need for additional parts.

Other characteristics and advantages will appear in the description which will be given of a comma headrest according to the invention.

Refer to the appended drawings on which:

BRIEF DESCRIPTION OF THE DRAWINGS

FIG. 3 is a perspective view of a comma headrest, according to the invention, showing the use of a plate forming the framework of the headrest, FIG 4 is a side sectional view of the headrest of FIG. 3 especially showing the attachment of the pins and the attachment of the cover to the plate, FIG. 5 is a detailed view of a design variant of the attachment of the pins to the plate.

DETAILED DESCRIPTION OF THE INVENTION

Figure 1:
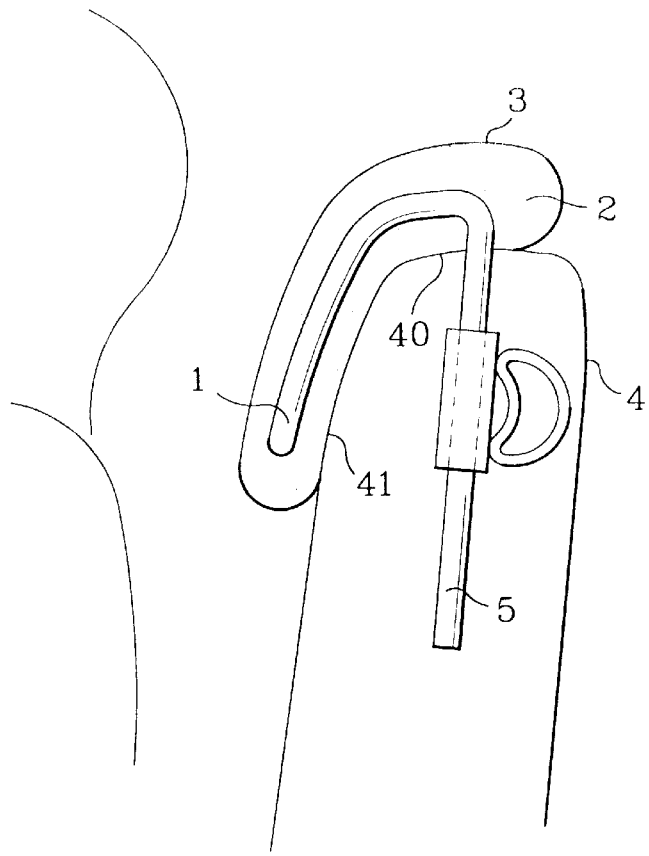
FIG. 1 is a side view of a known type of comma headrest.
Figure 2:
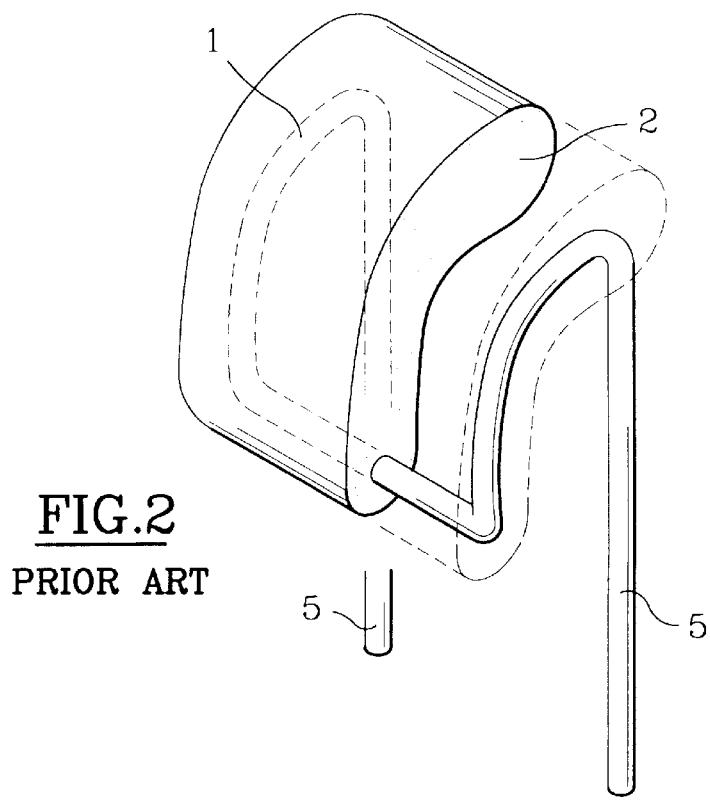
FIG. 2 is a perspective view of the headrest of FIG. 1, especially showing the use of a tubular framework.

We will not come back here to the headrest shown on FIGS. 1 and 2 the description of which was already given in the presentation of a prior art comma headrest, in the introductory part of these specification.

The comma headrest, shown on FIG. 3, includes a framework 10 acting as a support for a padding 20, foam for instance, the pins 30 and a cover 40 to cover the padding. The headrest includes a body 21 and a lip 22 which extends substantially towards the seat pan (not shown).

The framework 10 consists of a plate made of a plastic material formed by moulding and with a thickness of around 3 mm for instance. The plate 10 is curved to follow the profile of the top of backrest 50 shown on FIG. 4 to form a sort of corner plate so that the plate covers the top 51 of the backrest 5 and a portion 52 of the bearing surface of the backrest when the headrest is in low position.

As shown on FIG. 4, the connection between the pins 30 and the body of the plate 10 is ensured by embedding into the plate one of the ends of each pin 30 which then forms an insert which is fixed in the plate during its manufacture. The embedded ends of the pins 30 include a groove into which the plastic material can penetrate, during moulding, enabling the pins to be efficiently held in the plate. On the other hand, the pins 30 are fixed into sockets 53 attached to the framework of the backrest 50.

To adjust the height of the headrest, the pins 30 can be installed so as to slide in the sockets 53. The locking of the pins in a translation direction will be ensured for instance in a manner known by one skilled in the art by locking means provided on the sockets and which can mate with notches made on the pins 30.

The portion 11 forming the body of the plate 10 ensures the stiffness of the headrest so that the lip 22 of the headrest deforms under the action of the force exerted along a direction more or less perpendicular to the lip. As stated previously, the lip deforms by bending elastically towards the backrest of the seat.

The cover 40 of the headrest is an envelope made of a textile material such as, for example, velvet, with an opening. The plate 10 includes studs 70 to ensure the attachment of the cover 40. The studs 70 are located on the front face of the plate and distributed around the periphery of the plate, near to the edge of the plate, and onto which the edge of the opening of the cover 40 is fastened, as shown on FIG. 4.

When the cover is installed on the plate, the headrest is placed in a mould the cavity of which corresponds to the outside shapes to be given to the headrest. Then, foam is injected inside the cover, by means of a nozzle passing through a hole (not shown) made in the plate. Bonding of the foam on one hand onto the front face of the plate by the opening made in the cover, and on the other hand onto the inner face of the cover, holds the cover 40 onto the plate complementing the function ensured by the studs 70.

To completely conceal the headrest framework plate, the padding can also be placed completely all around the plate. In this case, the headrest framework plate 10 could also be placed in a mould the cavity of which corresponds to the outer shapes to be given to the padding and the foam injected. To avoid problems subsequent to installing an envelope forming a cover for the headrest, a flocking process, such as known by one skilled in the art, could, for example, be used to cover the padding with textile fibres.

FIG. 5 shows a variant for attaching the pins 30 to the plate 10 of the headrest. As the plate can advantageously be made by moulding, a boss could be made on the plate. One of the ends of each pin 30 would be inserted into a hole made in the boss and would be held in place by a tight-type fit. In addition, the pins 70 could also be obtained by moulding.

The invention is not limited to the designs shown only as an example. In particular, ribs could be made on the plate. This arrangement would enable the portion of the headrest plate forming the lip to be stiffened.

We claim:

1. A headrest attached to an automobile vehicle seat, the headrest including a pad that has a generally horizontal main body portion overlying the top of a backrest and a downwardly extending lip portion overlying an upper forward portion of the backrest, the headrest comprising:

a resilient curved frame plate following a confronting profile of the backrest and serving as a rear support for the main body portion and the lip portion of the pad; and pins having upper ends secured within the plate and further having lower ends slidingly received within the backrest.

2. The headrest of claim 1 wherein the pad is an overmolded member adhering to the plate.

3. The headrest of claim 1 further comprising a cover overlying a forward surface of the pad, and means for attaching the pad to the plate.

4. The headrest of claim 3 wherein the cover further comprises an opening, edges of which are secured to a periphery of the plate.

5. The headrest of claim 3 wherein the attaching means are studs.

6. The headrest of claim 1 wherein the plate is made of a plastic material.

7. The headrest in accordance with claim 6 wherein the plate is a molded member in which the upper ends of the pins are embedded.

* * * * *